United States Patent
Hoyer et al.

(10) Patent No.: US 9,294,418 B2
(45) Date of Patent: Mar. 22, 2016

(54) 64B/66B CODEC FOR ETHERNET APPLICATIONS

(71) Applicant: Marvell International Ltd., Hamilton (BM)

(72) Inventors: Claus F. Hoyer, Espergaerde (DK); Jacob J. Schroder, Lyngby (DK)

(73) Assignee: Marvell International Ltd., Hamilton (BM)

( * ) Notice: Subject to any disclaimer, the term of this patent is extended or adjusted under 35 U.S.C. 154(b) by 63 days.

(21) Appl. No.: 14/090,995

(22) Filed: Nov. 26, 2013

(65) Prior Publication Data
US 2014/0146835 A1 May 29, 2014

Related U.S. Application Data

(60) Provisional application No. 61/730,727, filed on Nov. 28, 2012.

(51) Int. Cl.
| | |
|---|---|
| H04J 3/24 | (2006.01) |
| H04L 12/931 | (2013.01) |
| H04L 29/06 | (2006.01) |
| H04L 25/49 | (2006.01) |
| H04L 12/413 | (2006.01) |

(52) U.S. Cl.
CPC ............. *H04L 49/00* (2013.01); *H04L 12/413* (2013.01); *H04L 25/4908* (2013.01); *H04L 69/04* (2013.01)

(58) Field of Classification Search
CPC ..... H04L 49/00; H04L 25/4908; H04L 69/04; H04L 12/413
USPC ......................................................... 370/474
See application file for complete search history.

(56) References Cited

U.S. PATENT DOCUMENTS

| | | | |
|---|---|---|---|
| 7,487,426 B2 | 2/2009 | Hoyer | |
| 7,639,687 B1 * | 12/2009 | Tsai et al. | 370/392 |
| 7,782,805 B1 * | 8/2010 | Belhadj et al. | 370/300 |
| 2005/0047433 A1 * | 3/2005 | Rizer et al. | 370/464 |
| 2007/0101241 A1 * | 5/2007 | Hoyer | 714/776 |
| 2013/0235886 A1 * | 9/2013 | Wang | 370/474 |

* cited by examiner

*Primary Examiner* — Mang Yeung

(57) ABSTRACT

Aspects of the disclosure provide a codec that transforms input data into a codeword. The codeword includes a header portion and a payload portion. The codec modifies the payload portion of the codeword based on a type control block that is included in the payload portion of the codeword. Specifically, the codec modifies a control block in the payload portion to create a reference block, which provisions for data blocks to be inserted in the codeword subsequent to the reference block. Thus, by modifying the payload portion of the codeword, the codec eliminates any wasted data bytes thereby achieving optimal usage of the payload bandwidth.

16 Claims, 5 Drawing Sheets

64B/66B CODEC FOR ETHERNET APPLICATIONS

CROSS-REFERENCE TO RELATED APPLICATION

This present disclosure claims the benefit of U.S. Provisional Application No. 61/730,727, filed on Nov. 28, 2012, the disclosure of which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A codec (coder-encoder) encodes a data stream or signal for transmission, storage, or encryption, and decodes the data for applications such as playback, editing or the like. A standardized 64b/66b codec as defined by the IEEE 802.3 group transforms a 64 bit data into a 66 bit codeword. The standard permits only a specific combination of data and control characters to be included in the codeword. Further, the standard imposes certain restrictions as to the location of a start control character within the codeword. Such restrictions tend to underutilize the payload bandwidth, thereby resulting in lower data transmission throughput. Data transmission in a fully flexible 64b/66b codec is increased by allowing any combination of data and control characters. However, the codeword structure of such a codec is significantly different than the codeword structure as defined by the IEEE standard, and is thus not compatible with the standard 100G Ethernet forward error correction schemes.

SUMMARY

Aspects of the present disclosure provide a codec that includes an encoding circuit configured to transform input data into a codeword. The codeword includes a header portion and a payload portion, wherein the payload portion further includes a type control block and a plurality of blocks that are either control blocks or data blocks. The encoding circuit is configured to determine a location of a first control block of the plurality of blocks in the payload portion of the codeword based on the type control block and modify the first control block to create a reference block. Further, the encoding circuit inserts data blocks in the payload portion of the codeword subsequent to the location now corresponding to the reference block.

Another embodiment provides a method that includes transforming input data into a codeword, wherein the codeword includes a header portion and a payload portion. The payload portion further includes a type control block and a plurality of blocks that are either control blocks or data blocks. The method determines a location of a first control block of the plurality of blocks in the payload portion of the codeword based on the type control block and modifies the first control block to create a reference block. The method eventually inserts data blocks in the payload portion of the codeword subsequent to the location now corresponding to the reference block.

Another embodiment provide a non-transitory computer readable medium storing program instructions for causing a processor to execute operations for encoding. The operations include transforming input data into a codeword, wherein the codeword includes a header portion and a payload portion. The payload portion further includes a type control block and a plurality of blocks that are either control blocks or data blocks. The operation further determines a location of a first control block of the plurality of blocks in the payload portion of the codeword based on the type control block and modifies the first control block to create a reference block. The operation eventually inserts data blocks in the payload portion of the codeword subsequent to the location now corresponding to the reference block.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
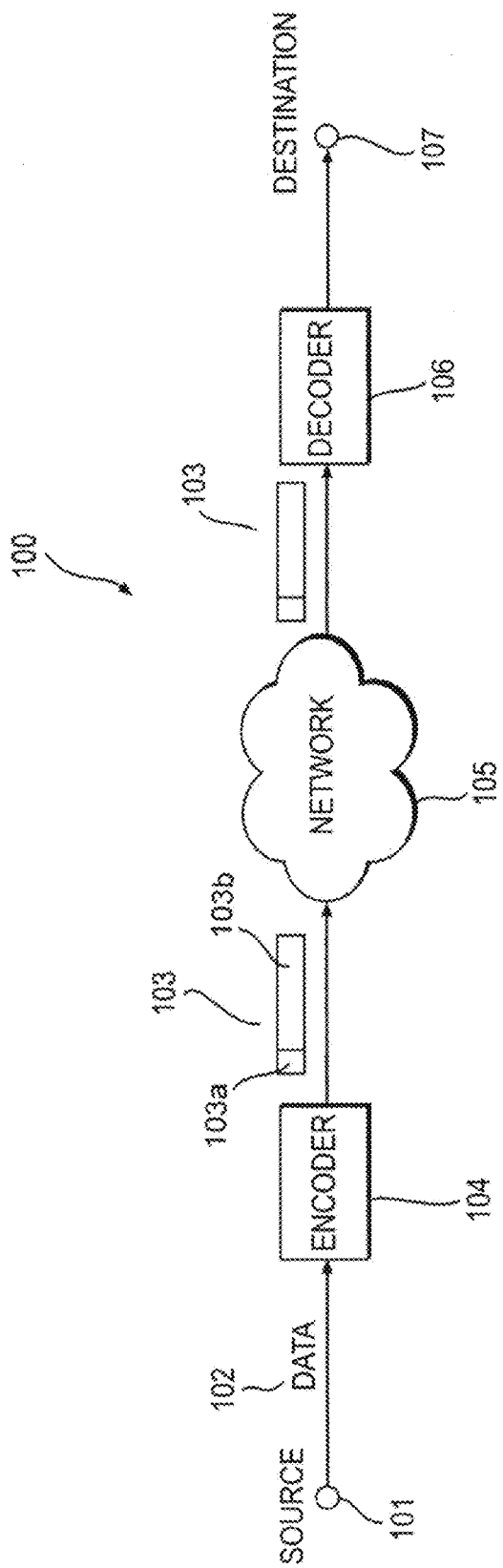
FIG. 1 shows an encoding-decoding communication system.

FIG. 1 shows a communication system 100 according to an embodiment. The system includes a source 101 that transmits data to a destination 107. The data 102, transmitted by the source 101 is first encoded by an encoder 104. The encoder 104 is configured to take as input, the data 102 to be transmitted to the destination 107 and convert the input data to a codeword 103 that includes a header 103a, and a payload 103b. In an example, the encoder 104 is a 64b/66b codec (coder-decoder). The 64b/66b codec is configured to transform a 64 bit input data, to a 66 bit codeword. Specific details regarding the codeword structure of the 64b/66b codec are discussed below with respect reference to FIG. 2.

The codeword 103 may undergo other forms of encoding and data processing steps such as physical layer coding, forward error correction, data scrambling or the like, prior to being sent to the communication network 105. The communication network 105 may be a wide area network, local area network or the like. The codeword 103 traverses the network 105, and upon reaching the destination 107, a decoder 106 (included at the destination) extracts the data from the received codeword. The encoder 104 and the decoder 106, of the communication system 100, may be a 64b/66b codec.

Figure 2:
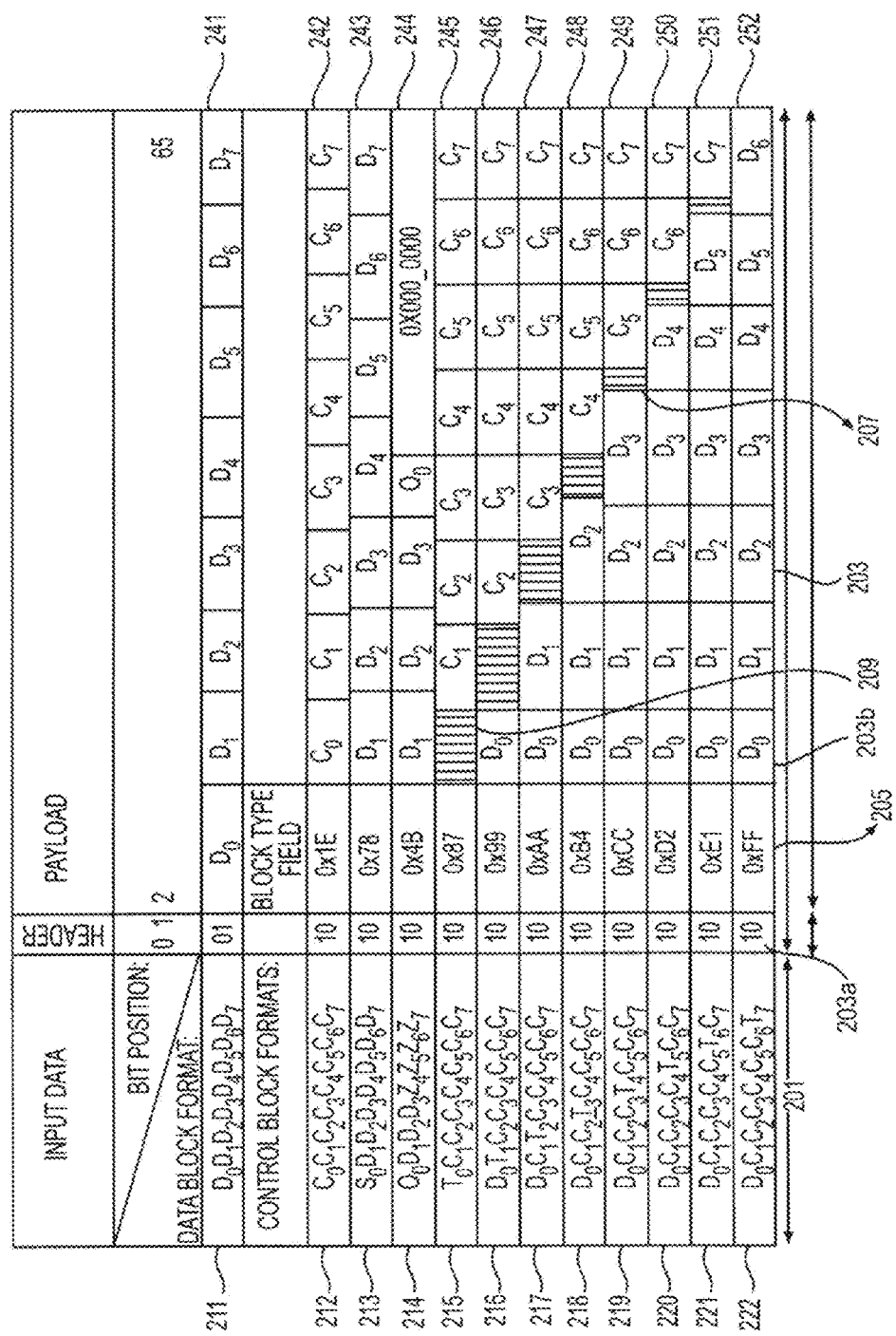
FIG. 2 shows a codeword structure for a standardized 64b/66b codec.

FIG. 2 depicts a codeword structure of a 64b/66b codec as standardized by the IEEE 802.3 group. In FIG. 2, input data 201, is represented as a codeword that includes a sequence of eight characters. The characters include data characters (represented as 'D'), control characters (represented as 'C'), a start character (represented as 'S') and a termination character (represented as 'T'). The start character 'S' indicates the beginning of data characters in a codeword and the termination character denotes the end of data characters that are included in the codeword. Control characters are framing characters that identify framing boundaries between groups of data characters.

The input data can be represented as a data codeword 211 that includes only data characters, or can be one of a control codeword 212-222, that includes a combination of data and control characters. However, the standard governs that the control codewords are permitted to include only specific combination of the data and control characters. Further, the standard also poses certain restrictions as to the location of certain control characters within the codeword. For example, as shown in codeword 213, a start character is permitted to appear only at the beginning position of the codeword.

The physical codeword structure of the 64b/66b codec corresponding to a particular codeword is represented in 203. The structure of each codeword is sixty six bits long and includes a header portion 203a, and a payload portion 203b. The header portion 203a is two bits long and the payload portion 203b is sixty four bits long. The payload portion is segmented to carry a plurality of data blocks and control blocks. Each data block is eight bits long and each control block is seven bits long. The header portion 203a is defined by either using the bit string '01' or '10'. The header '01' indicates that the payload portion of the codeword includes only data blocks. For example, the codeword structure 241, (corresponding to the data codeword 211) includes the header '01', and eight data blocks represented as $D_0$-$D_7$.

For the control codewords 212-222, the structure of the codewords 242-252 include an eight-bit type control block 205, that occupies the first byte in the payload portion of the codeword. The hexadecimal value of the type block determines the positioning of data blocks and control blocks in the payload portion of the codeword. For example, considering the codeword structure 243 (corresponding to the control codeword 213), the hexadecimal value of '0x78' in the type block field indicates that the payload portion of the codeword 243 includes seven data blocks, $D_1$-$D_7$. This corresponds to the control codeword 213, which denotes a start character followed by seven data characters. Similarly, in the codeword structure 242, the hexadecimal value of '0x1E' in the type block field indicates that the remainder of the payload portion includes only control blocks that are represented as $C_0$-$C_7$.

As described above, the standard permits the start character (S) to appear only at the beginning of the codeword. This requirement results in an inefficient use of the payload bandwidth. For example, the control codeword 215 begins with a termination character ($T_0$), followed by seven control characters ($C_1$-$C_7$). The corresponding codeword structure 245 includes a predetermined hexadecimal value of '0x87' in the type block field. This particular hexadecimal value indicates that the last data block was transmitted in the previous codeword, and that the current codeword includes only control blocks. Since the start character is allowed to appear only at the first position in a codeword, no data blocks can be transmitted in the present codeword. Therefore, a bandwidth of seven bytes is wasted by the transmission of control characters in the present codeword. Further, since the control blocks are seven bits long, and the control/data blocks in the payload portion of a codeword need to be eight-byte aligned, the codeword 245 also has a total of seven unused bits represented by 209.

The control codewords 216-221, represent a termination character that appears in the control codeword. The corresponding codeword structures 246-251, each include a specific hexadecimal value in the type block field, which indicates a location as to where control blocks begin in the payload portion of the codeword. Similar to the codeword structure of 245, the codeword structures 246-251 (corresponding to the codewords 216-221) include up to six control blocks in the payload portion of the codeword, thereby resulting in inefficient use of payload bandwidth.

In what follows, a modified codeword structure for the 64b/66b codec configured to increase data throughput is first described. Further, a method of encoding and decoding using the modified 64b/66b codeword structure is described.

Figure 3:
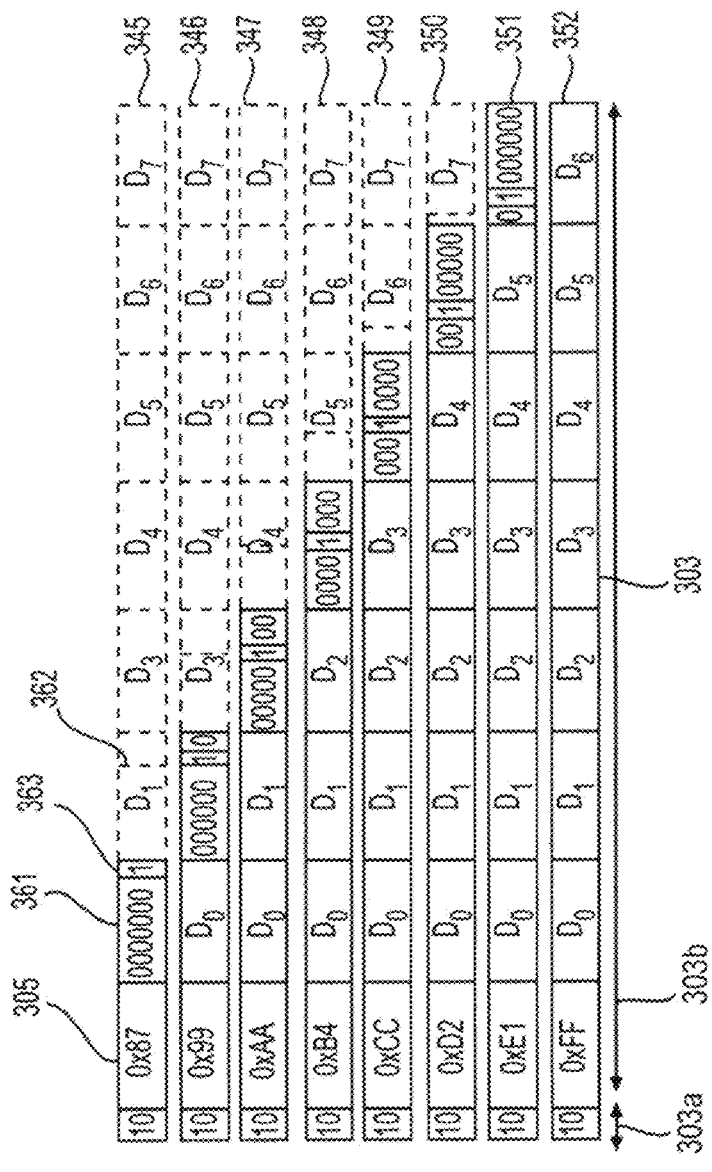
FIG. 3 shows a modified codeword structure for a 64b/66b codec according to an embodiment of the disclosure.
Figure 3:
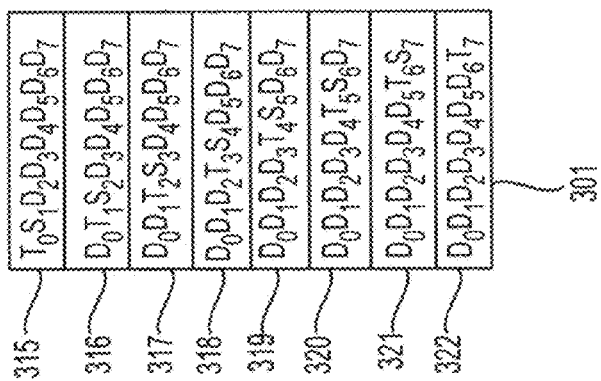

FIG. 3 shows a modified codeword structure of a 64b/66b codec according to an embodiment of the present disclosure. In FIG. 3, block 301, represents the control codewords 315-322, that correspond to the control codewords 215-222 of FIG. 2. The codeword structure 345-352 corresponding to each control codeword 315-322 is depicted in 303. Similar to the codeword structure depicted in FIG. 2, each codeword structure in FIG. 3, includes a header portion 303a that can be two bits long and a payload portion 303b that can have a length of sixty four bits. The payload portion of the codeword structure includes an eight bit type block 305 that determines the format of the data blocks and control blocks in the payload portion of the codeword.

To increase data throughput, the modified control codewords 301, permit a start character (S) to appear within the codeword sequence of eight characters. In an example, the control codeword 315, includes a start character ($S_1$) inserted after the termination character ($T_0$). Thus, data characters $D_2$-$D_7$ are permitted to be transmitted in the present codeword. Specifically, comparing the control codeword 215 in FIG. 2, to the control codeword 315 in FIG. 3, six data characters $D_2$-$D_7$ may be transmitted in the present codeword, as opposed to transmitting seven control characters $C_1$-$C_7$ as shown in the codeword 215 in FIG. 2.

To incorporate the additional data characters in the payload portion of the codeword, the modified 64b/66b codec (referred to herein, as a Quantum 64b/66b codec), uses the type block field to determine the location of the first control block in the payload portion of the codeword structure. In an example, referring to codeword structure 345, the type block includes a hexadecimal value '0x87' that is similar to the block type field of FIG. 2. Based on this value, the codec can determine the location (in the payload portion of the codeword) of the first control block 362, which would be included in the standardized codeword structure.

Upon detecting the first control block, an encoding circuit included in the codec can be configured to change the most significant bit of the first control block from bit '0' to bit '1'. Recall, that the IEEE standard permits the use of only two control blocks, the idle control block that is encoded by the seven bit string '0000000', and an error control block that is encoded by the seven bit string '0011110'. Both, the idle control block and the error control block have a bit '0' in the most significant bit position. The codec modifies the most significant bit and couples it with any unused bits to create a reference block 361. Note that as stated previously with reference to block 209 in FIG. 2, that unused bits result from using eight bit long data blocks and seven bit long control blocks and having a requirement of aligning the control and data blocks on an 8-byte boundary.

Similarly, control codewords 316-321 can insert up to five data blocks in the payload portion of the codeword, instead of assigning the corresponding payload bandwidth to control blocks. Thus, the bandwidth of the payload portion can be used in an optimal manner, while ensuring that the modified codeword structure uses the same hexadecimal type block values as set by the 802.3 standard.

The Quantum codec modifies the codewords to include a start character to immediately follow a termination character. Both, the start and termination characters are encoded by a type control block that indicates the ordering of the blocks in the payload portion of the codeword. By modifying the most significant bit of the first control block, and thereafter creating a reference block, the Quantum codec permits an increase data throughput. Further, the Quantum codec is compatible with the 100 Gigabit Ethernet standard and transparent to physical layer coding schemes, forward error correction control schemes and data scrambling systems.

Moreover, as compared to the standard 64b/66b codec, the Quantum codec completely reduces the number of wasted data bytes in the payload portion of the codeword. For example, considering a payload of 64 bytes, the standard 64b/66b codec, results in wasting six data bytes (consuming a total of seventy two bytes including the start and terminate characters) and achieves a total overhead of 12.5%. In contrast, the Quantum codec does not waste any data bytes and consumes a total of sixty-six bytes including the start and terminate characters. Thus, the quantum codec achieves a total overhead of 3.1%.

Further, advantages of the Quantum codec can be realized in that, the created reference block in the payload portion of the codeword is eight bits long. As stated above, higher data throughput is achieved by only incorporating the modified, most significant bit of the first control block. Thus, the remaining seven bits of the reference block are not used. This unused capacity can be used, for example, to create special control characters for proprietary applications. Further, a hamming distance between the codewords can be increased, by using all the eight bits of the reference block to improve error robustness in high bit-error prone applications. Specifically, the Hamming distance between two strings of equal length is the number of positions at which the corresponding symbols are different. For example, the two eight bit strings '01010101' and '01011001' have a Hamming distance of 2. By using all the eight bits of the reference block, codewords can be created such that a larger Hamming distance between codewords is achieved, thereby increasing error robustness.

Figure 4:
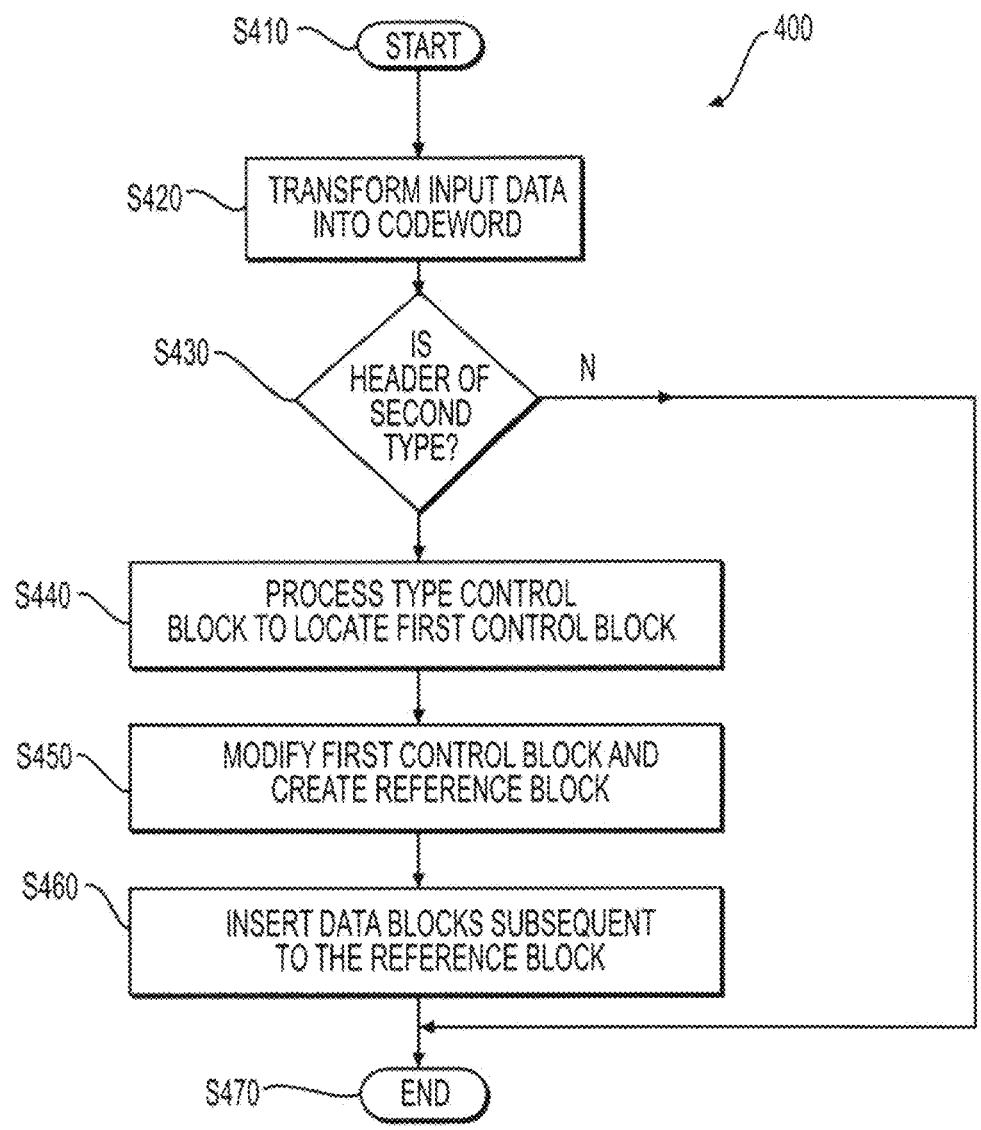
FIG. 4 depicts a flowchart outlining an encoding process 400 according to an embodiment of the disclosure.

FIG. 4 shows a flowchart outlining a process 400 of encoding a codeword to increase data block transmission according to an embodiment of the disclosure. The process starts at S410, and proceeds to S420.

At S420, input data is transformed into a codeword that includes a payload portion and a header portion. The process then moves to S430.

At S430, a query is made to determine the type of header included in the header portion of the codeword. Specifically, a query is made to check if the header is of a predetermined type, which indicates the presence of control blocks in a payload portion of the codeword. If the response to the query is affirmative, the process moves to S440. If the response to the query is negative, the process moves to S470 and terminates. Note that if the payload portion of the codeword includes only data blocks, no further increase in data transmission can be obtained. In an example, if a 2-bit header is determined to be '01', the codec determines that the payload portion of the codeword includes only data blocks, whereas if the 2-bit header is '10', the codec determines the presence of control blocks in the payload portion of the codeword.

At S450, the identified first control block from S440 is modified to create a reference block. Specifically, a most significant bit of the first control block is modified and paired with unused bits in the payload portion to create a reference block.

Further, at S460, the encoder inserts data blocks, subsequent to the reference block created in S450. In doing so, consecutive code words can be configured to transmit data blocks, as opposed to transmitting a series on control blocks between data transmission. Thus, the bandwidth of a codeword can be used in an optimal manner. After the insertion of data blocks in S460 the process moves to S370 and terminates.

Figure 5:
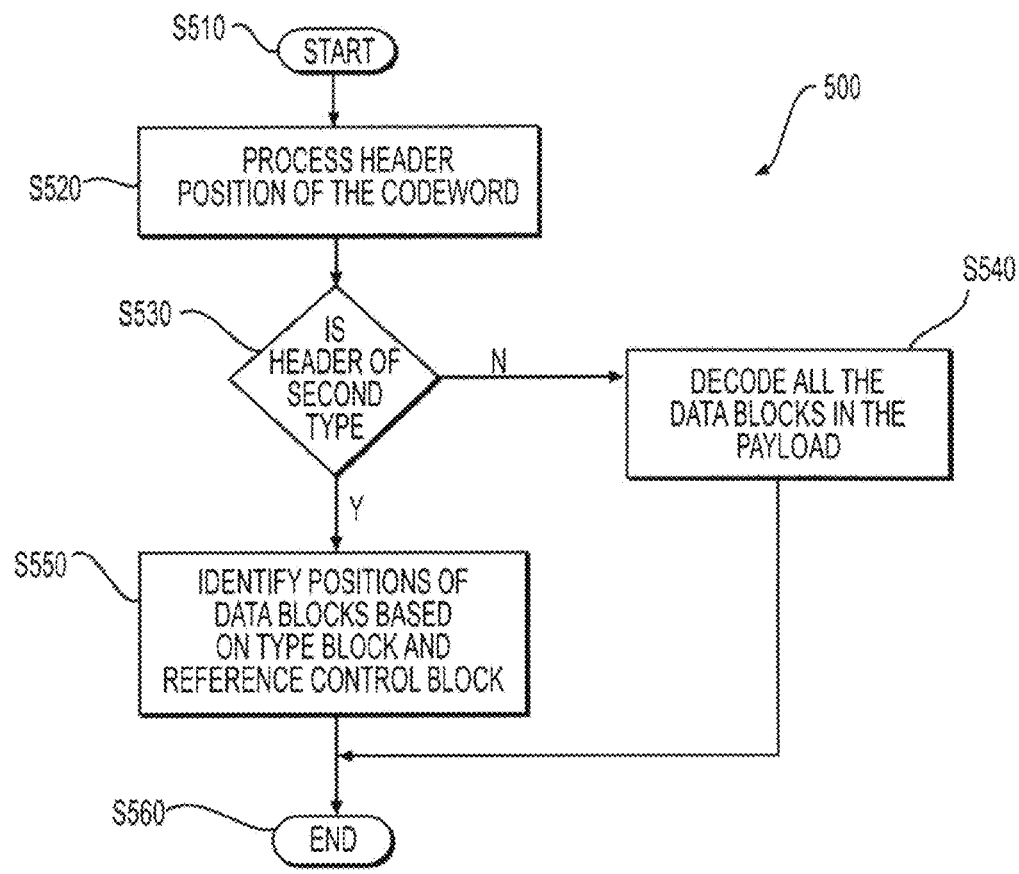
FIG. 5 depicts a flowchart outlining a decoding process 500 according to an embodiment of the disclosure.

FIG. 5 shows a flowchart outlining a process 500 of decoding a codeword according to an embodiment of the disclosure. The process starts at S510, and proceeds to S520.

In S520, the header portion of the codeword is first processed to determine the type of header.

At S530, a query is made to check if the processed header of S520 is of a predetermined type, which indicates that data blocks were inserted in the payload portion of the codeword in place of control blocks. If the response to the query is affirmative, the process moves to S550. If the response to the query in S530 is negative, the process moves to S540. In an example, if a 2-bit header is '01', the decoder determines that the payload portion of the codeword includes only data blocks and proceeds to S540. On the other hand, if the 2-bit header is '10', the decoder determines that the payload portion of the codeword was modified. Specifically, control blocks in the codeword were replaced with additional data blocks in order to increase data block throughput.

At S540, the decoder decodes the data blocks from the payload portion of the codeword and then the process moves to S560 and terminates.

At S550, the decoder processes a type control block and a reference block included in the payload portion of the codeword to determine the positions of data blocks in the codeword. Upon locating the positions of the data blocks, the decoder merely extracts the data blocks and terminates the process in S560.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A codec comprising:
   an input circuit configured to input data; and
   an encoding circuit configured to
      transform the input data into a codeword, the codeword including a header portion and a payload portion, the payload portion including (i) a type control block, and (ii) a plurality of blocks that are either control blocks or data blocks;
      determine a location of a first control block of the plurality of blocks in the payload portion of the codeword based on the type control block;
      modify the first control block to create a reference block by modifying a most significant bit of the first control block, the reference block being eight bits long and including the most significant bit of the first control block and seven unused bits; and
      insert data blocks in the payload portion of the codeword subsequent to the location now corresponding to the reference block.

2. The codec of claim 1, wherein the type control block has a length of eight bits and determines an ordering of the data blocks and the control blocks in the payload portion of the codeword.

3. The codec of claim 1, wherein the header portion of the codeword includes a header of a first type or a second type, the first type header indicating that the payload portion of the codeword includes only data blocks and the second type header indicating that the payload portion of the codeword includes a combination of data blocks and control blocks.

4. The codec of claim 1, wherein the payload portion of the codeword has a length of sixty four bits, and wherein the header portion has a length of two bits.

5. The codec of claim 1, wherein the control blocks have a length of seven bits, and wherein the data blocks have a length of eight bits.

6. The codec of claim 1, wherein the encoding circuit transforms a sixty four bit input data to a sixty six bit codeword.

7. The codec of claim 1, wherein the first control block is an idle control block or an error control block, the idle control block being encoded as a seven bit string represented by '0000000', and the error control block being encoded by a seven bit string represented as '0011110'.

8. The codec of claim 1, wherein the reference block is eight bits long, and wherein the coding circuit is further configured to encode all eight bits of the reference block to increase a hamming distance between the reference block and a control block.

9. The codec of claim 1, wherein the payload portion of the codeword includes an overhead of 3.1%.

10. The codec of claim 1, further comprising:
a decoding circuit configured to
process the header portion of the codeword to determine a presence of the type control block; and
identify data blocks in the codeword based on (i) the type control block and (ii) the reference block.

11. A method comprising:
transforming input data into a codeword, the codeword including a header portion and a payload portion, the payload portion including (i) a type control block, and (ii) a plurality of blocks that are either control blocks or data blocks;
determining a location of a first control block of the plurality of blocks in the payload portion of the codeword based on the type control block;
modifying the first control block to create a reference block by altering a most significant bit of the first control block from bit '0' to bit '1', the reference block being eight bits long and including the most significant bit of the first control block and seven unused bits; and
inserting data blocks in the payload portion of the codeword subsequent to the location now corresponding to the reference block.

12. The method of claim 11, further comprising:
processing a header portion of the codeword to identify whether the payload portion of the codeword contains the type control block.

13. The method of claim 11, further comprising:
identifying a location of the data blocks in the codeword based on the type control block and the reference block.

14. A non-transitory computer readable medium storing program instructions for causing a processor to execute operations for encoding, the operations comprising:
transforming input data into a codeword, the codeword including a header portion and a payload portion, the payload portion including (i) a type control block and (ii) a plurality of blocks that are either control blocks or data blocks;
determining a location of a first control block of the plurality of blocks in the payload portion of the codeword based on the type control block;
modifying the first control block to create a reference block by changing a most significant bit of the control block from bit '0' to bit '1', the reference block being eight bits long and including the most significant bit of the first control block and seven unused bits; and
inserting data blocks in the payload portion of the codeword subsequent to the location now corresponding to the reference block.

15. The non-transitory computer readable medium of claim 14, further comprising:
processing a header portion of the codeword to identify if the payload portion of the codeword contains the type control block.

16. The non-transitory computer readable medium of claim 14, further comprising:
identifying the data blocks based on the type control block and the reference block.

* * * * *